United States Patent [19]

Griffith et al.

[11] Patent Number: 5,740,882
[45] Date of Patent: Apr. 21, 1998

[54] COMBINATION HUNTING STAND AND GAME CARRIER APPARATUS

[76] Inventors: Ricky L. Griffith, 4626 Hicks Hwy., Olivet, Mich. 49076; Randy L. Griffith, 1576 Riley Center Rd., Riley Twp., Mich. 48041

[21] Appl. No.: 658,941

[22] Filed: May 31, 1996

[51] Int. Cl.⁶ .................... A45F 3/26; A01M 31/02
[52] U.S. Cl. ................ 182/20; 182/116; 182/187; 182/133
[58] Field of Search ................ 182/20, 116, 187, 182/188, 133, 134, 135, 136

[56] References Cited

U.S. PATENT DOCUMENTS

| | | | |
|---|---|---|---|
| D. 359,133 | 6/1995 | Dull et al. | D25/62 |
| 1,221,579 | 4/1917 | Olds | |
| 3,352,379 | 11/1967 | Riggs | 182/20 |
| 4,321,982 | 3/1982 | Strickland | 182/20 |
| 4,582,165 | 4/1986 | Latini | 182/20 |
| 5,009,283 | 4/1991 | Prejean | 182/116 |
| 5,195,611 | 3/1993 | Untz | 182/187 |
| 5,282,520 | 2/1994 | Walker | 182/116 |
| 5,295,556 | 3/1994 | Mullin | 182/116 X |
| 5,433,291 | 7/1995 | Shoestock, Sr. | 182/20 |
| 5,492,196 | 2/1996 | Michno | 182/20 |

Primary Examiner—Leslie A. Braun
Assistant Examiner—Long Dinh Phan
Attorney, Agent, or Firm—Ian C. McLeod; Mary M. Moyne

[57] ABSTRACT

A combination hunting stand and game carrier apparatus (10) is described. The apparatus includes a first frame member (12), a second frame member (22) and a third frame member (42). A wheel (48) is mounted on the third frame member to allow for moving the apparatus in the game carrier configuration. The wheel is removed from the third frame member and rotated 90° and remounted on the third frame member to provide a seat for the apparatus in the game carrier configuration. A pair of handles (60) are provided on either side (12C) of the first frame member and allow for moving the apparatus in the game carrier configuration. The handles are removed from the first frame member and reattached between the first frame member and the second frame member to act as braces for the hunting stand configuration.

24 Claims, 9 Drawing Sheets

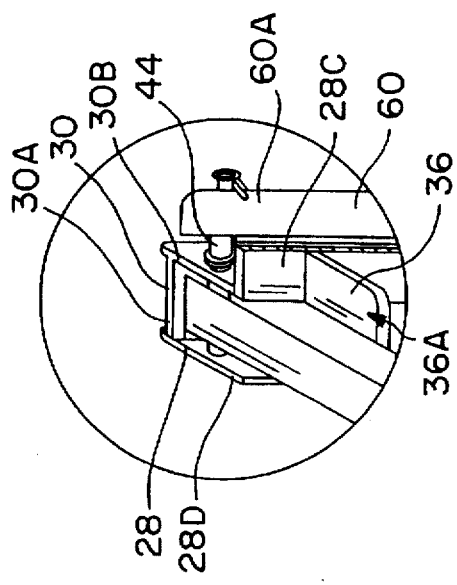
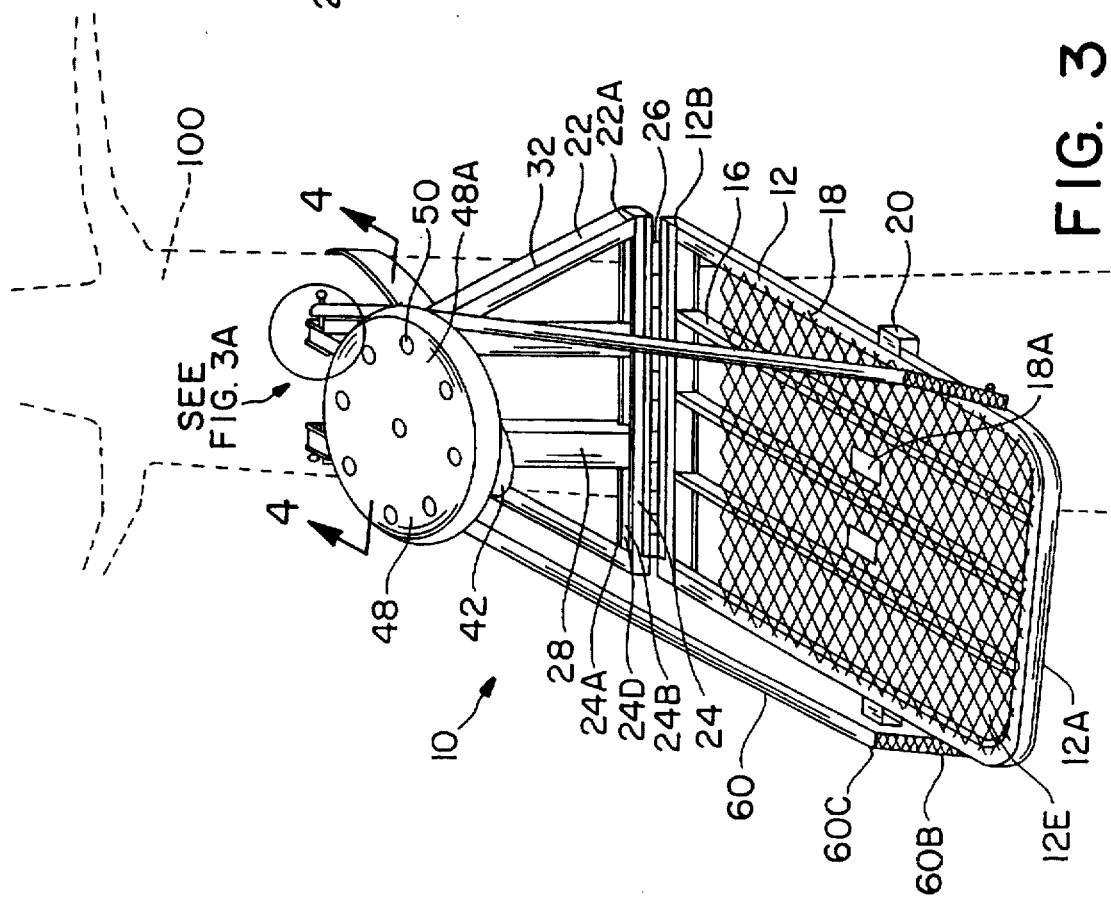

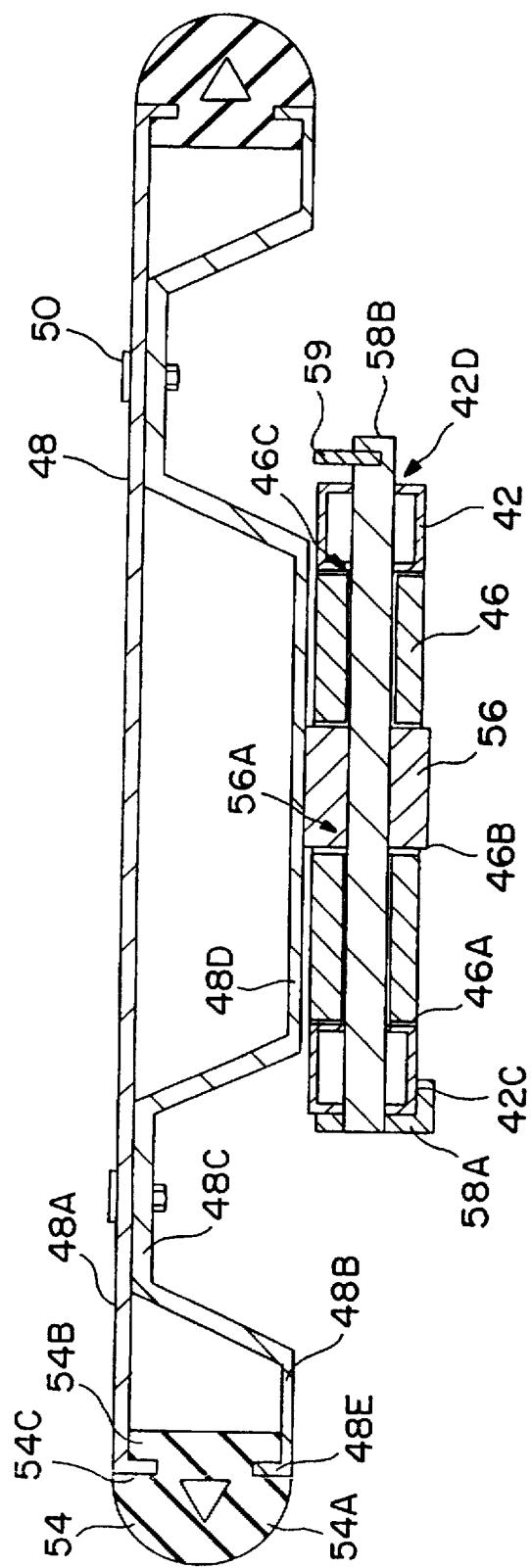

5,740,882

1

COMBINATION HUNTING STAND AND GAME CARRIER APPARATUS

BACKGROUND OF THE INVENTION

(1) Field of the Invention

The present invention relates to a combination hunting stand and game carrier apparatus. In particular the invention relates to a combination hunting stand and game carrier apparatus in which the seat in the hunting stand configuration is removed and remounted on the frame in a rotated position to provide the wheel in the game carrier configuration. The handles in the game carrier configuration are used as braces in the hunting stand configuration. When in the hunting stand configuration, the apparatus can be mounted in a tree and used as a tree stand or positioned on the ground surface and used as a hunting stand or ground platform.

(2) Description of the Related Art

The related art has shown various types of combination tree or hunting stand and game cart apparatus. Illustrative are U.S. Pat. Nos. 3,352,379 to Riggs; 4,321,982 to Strickland; 5,195,611 to Untz; 5,282,520 to Walker and 5,433,291 to Shoestock, Sr.

Also of interest is U.S. Pat. No. 5,009,283 to Prejean which shows a hunting stand having a variety of mounting methods. The stand can be provided with a separate add-on wheel assembly which allows the stand, ancillary equipment and game to be balanced on a wheel and carried by the stand.

Only of minimal interest are U.S. Pat. No. 1,221,579 to Olds which shows a combination wheelbarrow and step ladder, U.S. Pat. No. 4,582,165 to Latini which describes a pack frame which converts into a tree stand and U.S. Pat. No. Des. 359,133 to Dull et which shows a tree stand having wheels.

There remains the need for a combination hunting stand and game carrier apparatus in which the apparatus is quickly and easily converted between configurations without the need for additional add-on equipment.

OBJECTS

It is therefore an object of the present invention to provide a combination hunting stand and game carrier apparatus. Further, it is an object of the present invention to provide a combination hunting stand and game carrier apparatus in which the seat in the hunting stand configuration is used as the wheel in the game carrier configuration. Still further, it is an object of the present invention to provide a combination hunting stand and game carrier apparatus in which the handles in the game carrier configuration are used as braces in the hunting stand configuration. Further still, it is an object of the present invention to provide a combination hunting stand and game carrier apparatus where the apparatus can be used as either a tree stand or a ground surface platform when in the hunting stand configuration. Further, it is an object of the present invention to provide a combination hunting stand and game carrier apparatus which is easy and quick to convert from one configuration to the other. Furthermore, it is an object of the present invention to provide a combination hunting stand and game carrier apparatus where, when in the hunting stand configuration, the relative positions of the frame members are varied to allow for mounting the apparatus in trees having various angles. Still further, it is an object of the present invention to provide a combination hunting stand and game carrier apparatus which, when in the game carrier configuration, is

2 used in a wheelbarrow-like fashion. Finally, it is an object of the present invention to provide a combination hunting stand and game carrier apparatus which is easy to manufacture and durable.

BRIEF DESCRIPTION OF THE DRAWINGS

FIG. 3 is a perspective view of the apparatus 10 in the hunting stand configuration mounted on a tree.

FIG. 3A is an enlarged view of a circle 3A of FIG. 3 without the wheel 48 showing the leg 42C of the third frame member 42 connected to the center member 28 of the second frame member 22.

FIG. 4 is a cross-sectional view of FIG. 3 along line 4—4 showing the wheel 48 as the seat, mounted between the mounting posts 46 by the mounting block 56 as the seat.

DETAILED DESCRIPTION OF THE PREFERRED EMBODIMENT

Figure 1:
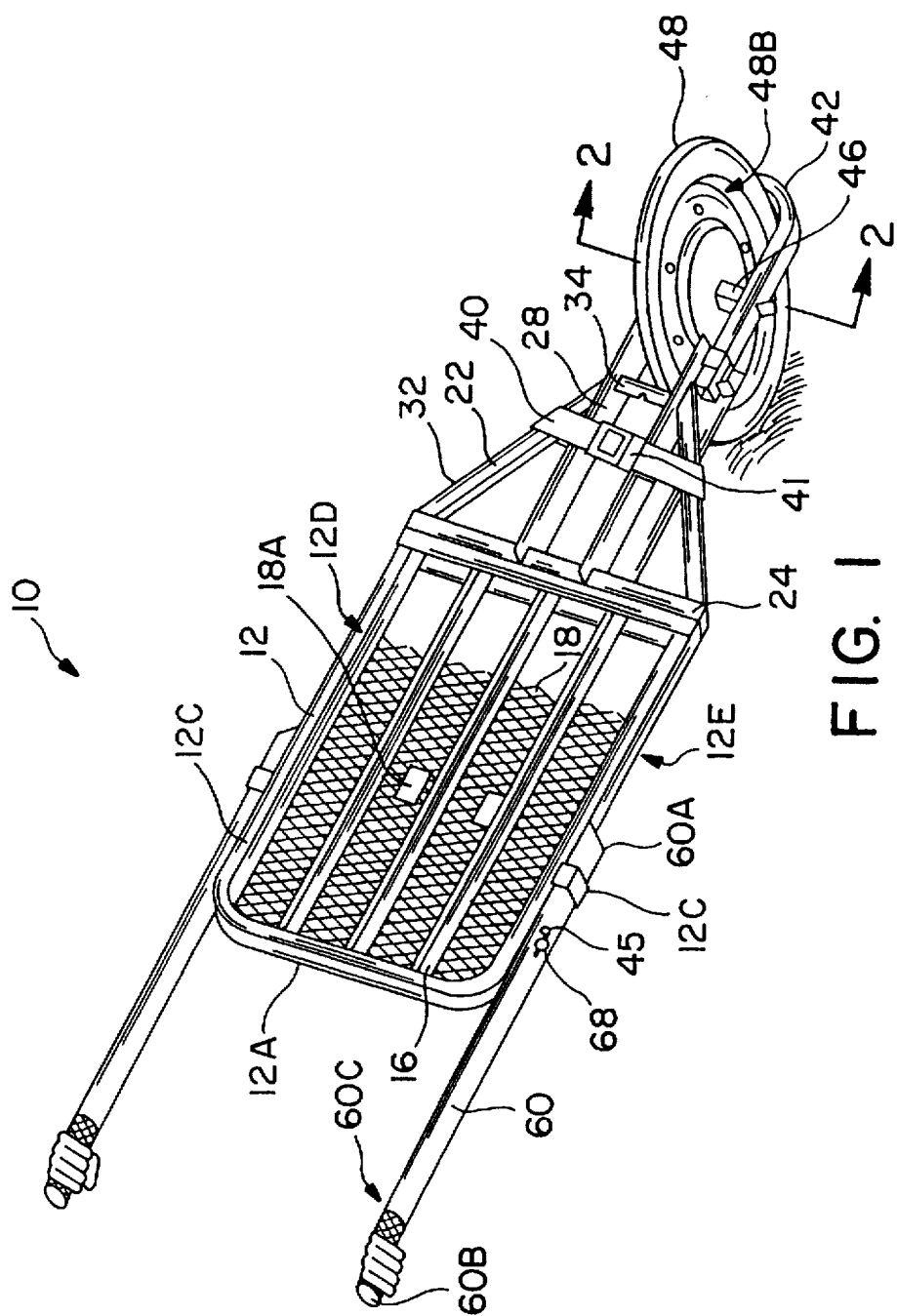
FIG. 1 is a perspective view of the apparatus 10 in the game carrier configuration.

The present invention relates to a combination hunting stand and game carrier apparatus which can be configured as one or the other, which comprises: a first frame means having opposed ends forming a support surface therebetween for supporting game when the apparatus is in the game carrier configuration; a second frame means having opposed ends with one end pivotably connected to one end of the first frame means; a third frame means having opposed ends with one end pivotably connected to the other end of the second frame means; a connecting means for holding the first, second and third frame means in one of the configurations; at least one wheel removably mounted on the third frame means enabling the apparatus to be moved when in the game carrier configuration, wherein the wheel is able to be removed from the third frame means and mounted on the third frame means to provide a seat means when the apparatus is in the hunting stand configuration; a handle means mounted on the first frame means for transporting the apparatus when configured as the game carrier; and a securing means provided on the second frame for mounting the apparatus on a support when in the hunting stand configuration.

Further, the present invention relates to a combination hunting stand and game carrier apparatus which can be configured as one or the other, which comprises: a first frame means having opposed ends forming a support surface therebetween for supporting game when the apparatus is in the game carrier configuration; a second frame means having opposed ends with one end pivotably connected to one end of the first frame means; a third frame means having opposed ends with one end pivotably connected to the other end of the second frame means wherein in the hunting stand configuration, the first, second and third frame means are configured in a C-shape with the third frame means spaced above the first frame means; a connecting means for holding the first, second and third frame means in one of the configurations; at least one elongate member having opposed ends and adapted to be connected at one of the ends to the first frame means when the apparatus is in the game carrier configuration to serve as a handle and adapted to be connected at one of the ends to the first frame means and at the other one of the ends to the second frame means to serve as a brace means when the apparatus is in the hunting stand configuration; at least one wheel removably mounted on the third frame means so that a longitudinal axis of the wheel is parallel to the ends of the third frame means when the apparatus is in the game carrier configuration for enabling the apparatus to be easily moved when the apparatus is in the game carrier configuration and is removed from the third frame means and mounted on the third frame means to provide a seat means when the apparatus is in the hunting stand configuration; and a securing means provided on the second frame for mounting the apparatus on a support in the hunting stand configuration.

Still further, the present invention relates to a method for configuring an apparatus as a game carrier or hunting stand, which comprises: providing a first frame means having opposed ends forming a support surface therebetween for supporting game and other loads when the apparatus is in the game carrier configuration and for supporting the user when the apparatus is in the hunting stand configuration; a second frame means having opposed ends with one end pivotably connected to one end of the first frame means; a third frame means having opposed ends with one end pivotably connected to the other end of the second frame means wherein in the hunting stand configuration, the first, second and third frame means are configured in a C-shape with the third frame means spaced above the first frame means; a connecting means for holding the first, second and third frame means in one of the configurations; at least one wheel removably mounted on the third frame means so that the wheel enables the apparatus to be moved when in the game carrier configuration, wherein the wheel is able to be removed from the third frame means and mounted on the third frame means to provide a seat means when the apparatus is in the hunting stand configuration; a handle means mounted on the first frame means for transporting the apparatus when configured as the game carrier; and a securing means provided on the second frame for mounting the apparatus on a support when in the hunting stand configuration; mounting the wheel as a seat in the hunting stand configuration or as a wheel in the game carrier configuration; and pivoting the first, second and third frame means into one of the configurations with the connecting means holding the frames in one of the configurations, wherein the handle means serves as a brace in the hunting stand configuration and as a handle in the game carrier configuration.

Furthermore, the present invention relates to a method for configuring an apparatus as a game carrier or as a hunting stand, which comprises: providing a first frame means having opposed ends forming a support surface therebetween for supporting game and other loads when the apparatus is in the game carrier configuration and for supporting the user when the apparatus is in the hunting stand configuration; a second frame means having opposed ends with one end pivotably connected to one end of the first frame means; a third frame means having opposed ends with one end pivotably connected to the other end of the second frame means; a connecting means for holding the first, second and third frame means in one of the configurations; an elongate member having opposed ends and adapted to be connected at one of the ends to the first frame means when the apparatus is in the game carrier configuration to serve as a handle and adapted to be connected at one of the ends to the first frame means and at the other one of the ends to the second frame means to serve as a brace means when the apparatus is in the hunting stand configuration; at least one wheel removably mounted on the third frame means so that a longitudinal axis of the wheel is parallel to the ends of the third frame means when the apparatus is in the game carrier configuration for enabling the apparatus to be easily moved when the apparatus is in the game carrier configuration and is removed and mounted on the third frame means to provide a seat means when the apparatus is in the hunting stand configuration; and a securing means provided on the second frame for mounting the apparatus on a support in the hunting stand configuration; mounting the wheel as a seat in the hunting stand configuration or as a wheel in the game carrier configuration; and pivoting the first, second and third frame means into one of the configurations, with the connecting means holding the frames in one of the configurations, wherein the elongate member serves as a brace in the hunting stand configuration and as a handle in the game carrier configuration.

Finally, the present invention relates to a convertible apparatus which can be configured either as a game carrier or a hunting stand, which comprises: a platform defined by a first frame with opposed ends forming a first support surface therebetween for supporting game, sides between the ends and a top and a bottom with a second support surface mounted on the bottom of the frame for supporting a user when in the hunting stand position; a second frame with opposed ends, sides between the ends and a top and a bottom and connected at the bottom adjacent one of the ends by a hinge to the bottom of the first frame wherein the second frame tapers from the one of the ends of the second frame towards the other of the ends of the second frame; a third frame connected to the other of the ends of the second frame and having a U-shape with opposed legs which extend parallel to a longitudinal axis of the third frame and which attach to the other of the ends of the second frame; at least one wheel removably mounted on the legs of the U-shaped third frame wherein as the game carrier configuration the wheel has an axis of rotation which is perpendicular to the longitudinal axis of the third frame; a securing means provided on the second frame; and a removable handle means mounted on each of the sides of the first frame wherein as the game carrier, the first, second and third frames are positioned so that the apparatus can be used to move game mounted on the platform with the wheel in contact with a ground surface and wherein as a hunting stand, the first, second and third frames are positioned in a C-shape with the bottom of the first frame and the second support surface in a reversed position, with the handle means secured between the sides of the first frame and the sides of the second frame with the wheel mounted on the third frame as a seat and with the securing means and the second frame in a position to be secured to a support.

Figure 6:
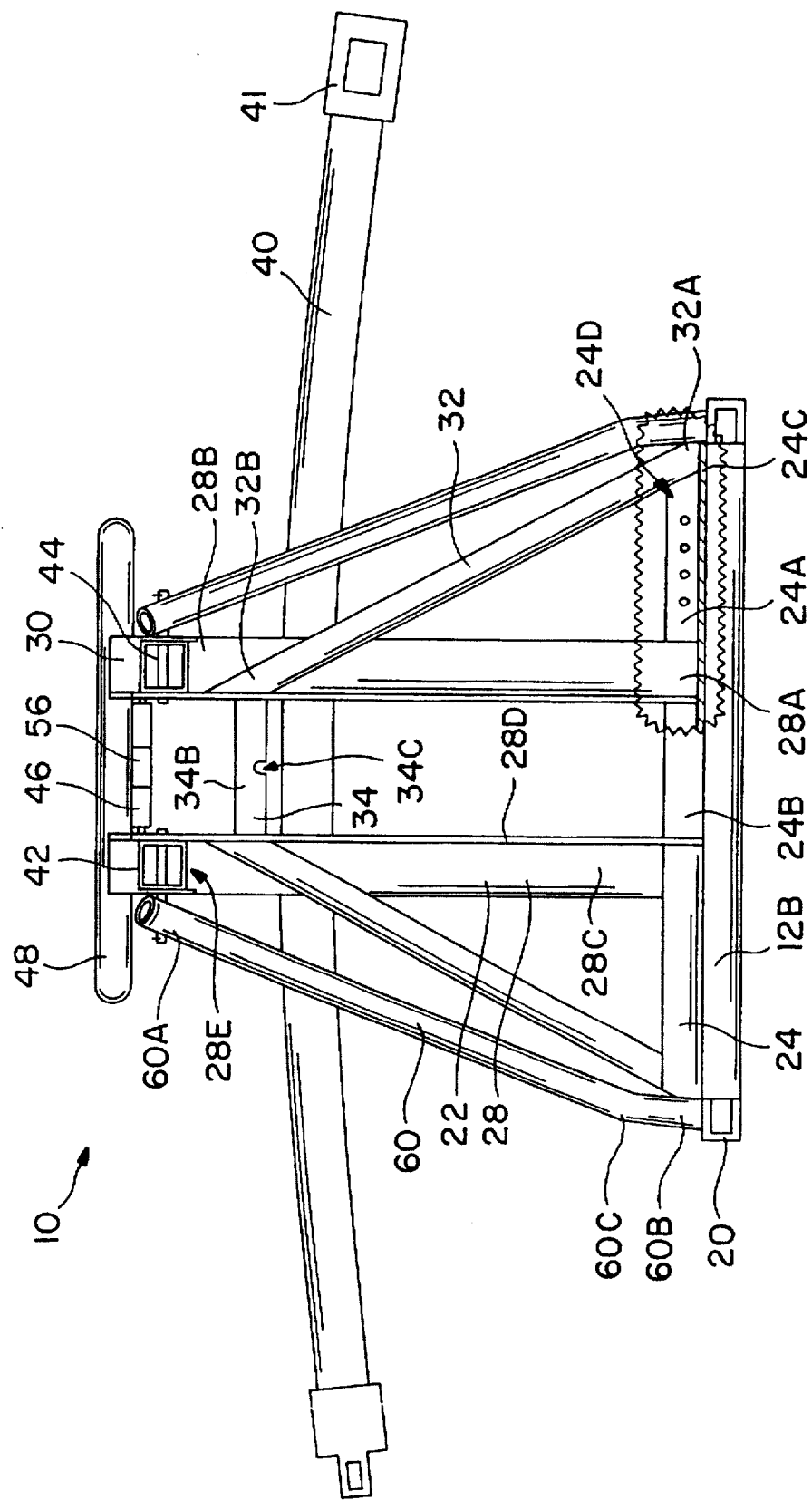
FIG. 6 is a back view of the apparatus 10 in the hunting stand configuration showing support members 32 mounted to the center members 28 and the legs 42C of the third frame member 42 mounted in the cutouts 28E in the center members 28 of the second frame member 22 with a cutaway section showing the center member 28 and the angled support member 32 mounted in the channel 24D of the channel member 24.
Figure 7:
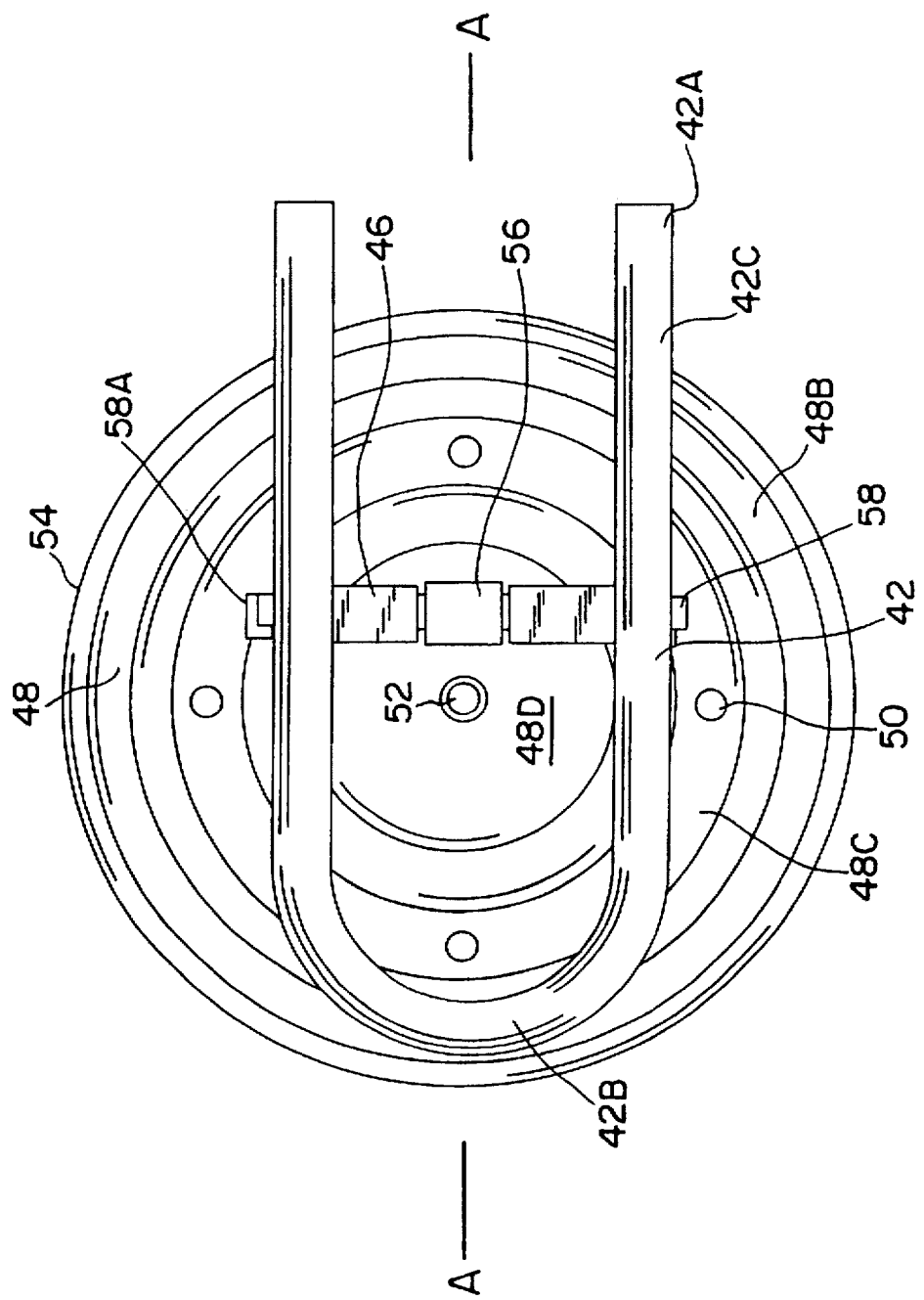
FIG. 7 is a partial bottom view of the third frame member 42 of the apparatus 10 showing the wheel 48 mounted by the mounting block 56 between the mounting posts 46.
Figure 8:
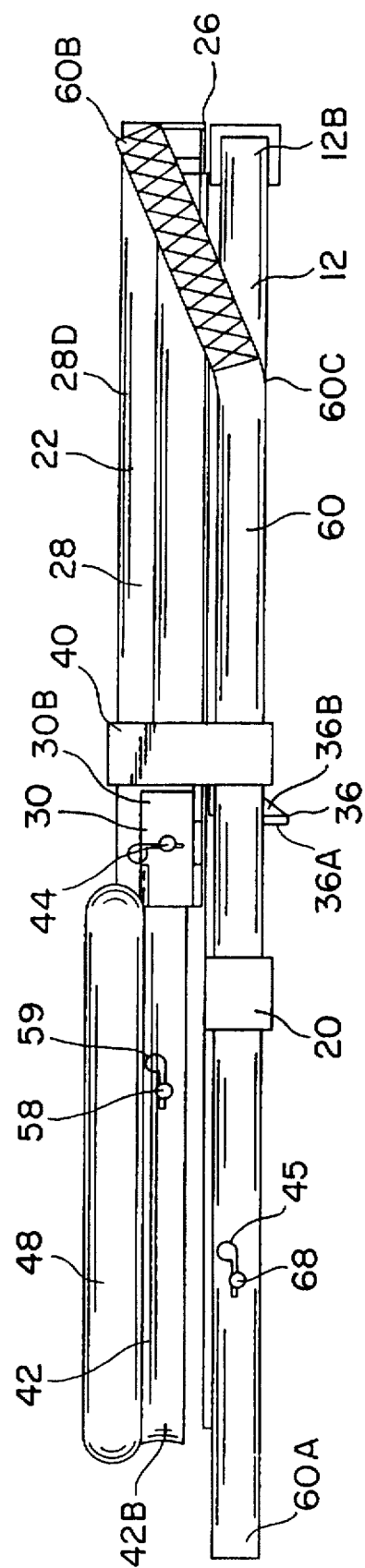
FIG. 8 is a side view of the apparatus 10 in the folded position for storage.

FIGS. 1 to 8 show the combination hunting stand and game carrier apparatus 10 of the present invention. The apparatus 10 includes a first frame member 12, a second frame member 22 and a third frame member 42. The first frame member, or platform 12, preferably has a first end 12A and a second end 12B with opposed sides 12C extending therebetween forming a top surface 12D and a bottom surface 12E. The first frame member 12 preferably has essentially a closed end, U-shape with the rounded end forming the first end 12A of the first frame member 12 (FIG. 1). The first frame member 12 is preferably constructed from two pieces which are fastened together, such as by welding. The sides 12C and first end 12A of the first frame member 12 are preferably formed as an integral piece having a U-shape. The integral piece is preferably constructed of 1.0×1.0×0.125 inch (2.54×2.54×0.318 cm) tubular alloy 6061 aluminum having a square cross-section. The second end 12B of the first frame member 12 is preferably formed by a separate channel piece having a size 1.25×1.25×0.125 inch thick (3.18×3.18×0.318 cm) and constructed of aluminum. The channel piece extends across the open end of the U-shaped, integral section such that the ends of the integral piece is within the channel of the channel piece. The first frame member 12 has reinforcing ribs 16 which extend between the ends 12A and 12B parallel to and spaced between the sides 12C of the first frame member 12. The reinforcing ribs 16 help provide the top and bottom surface 12D and 12E of the first frame member 12, to support game and/or hunting equipment when the apparatus 10 is used in the game carrier configuration (FIG. 1) and to support the user (not shown) in the hunting stand configuration (FIG. 3). In the preferred embodiment, there are three (3) reinforcing ribs 16. The reinforcing ribs 16 are preferably welded to the first end 12A of the first frame member 12 and are mounted within the channel of the channel piece forming the second end 12B. The reinforcing ribs 16 are preferably constructed of 0.50×1.0 inch (1.27×2.54 cm) extruded tubular aluminum having a square cross-section. A support surface 18 is mounted on the bottom surface 12E of the first frame member 12. The support surface 18 preferably extends completely from one side 12C of the first frame member 12 over the reinforcing ribs 16 to the other side 12C of the first frame member 12. The surface 18 preferably extends from the first end 12A of the first frame member 12 to adjacent the second end 12B of the first frame member 12. The support surface 18 is provided with openings 18A which accommodate the supports 36 when the apparatus 10 is in the folded, storage position (to be described in detail hereinafter) (FIG. 8). The support surface 18 is preferably constructed of 0.75×0.081 inch (1.91×0.206 cm) expanded metal mesh such as heavy standard aluminum expanded and sold by Alro Steel Corporation located in Lansing, Mich. The sides 12C of the first frame member 12 preferably have mounting brackets 20 on the side opposite the reinforcing ribs 16. The mounting brackets 20 preferably have a square cross-section.

The second frame member, or riser 22, has a first end 22A and a second end 22B with an essentially frusto triangular shape with the truncated apex forming the second end 22B such that the second frame member 22 tapers from the first end 22A to the second end 22B. The second frame member 22 includes an end member 24, a pair of center members 28 and a pair of support members 32. The end member 24 has a channel shape with a first leg 24A and a second leg 24B with a bottom wall 24C extending therebetween forming a channel 24D (FIG. 6). The end member 24 forms the first end 22A of the second frame member 22. The first end 22A of the second frame member 22 is pivotably connected to the second end 12B of the first frame member 12. In the preferred embodiment, the second end 12B of the first frame member 12 and the first end 22A of the second frame member 22 have essentially the same length. The first and second frame members 12 and 22 are preferably connected together by a hinge 26 which is mounted on the channel piece of the first frame member 12 adjacent the bottom surface 12E of the first frame member 12 and the first leg 24A of the end member 24 of the second frame member 22 and extends almost the entire length of the ends 12B and 22A of the first and second frame members 12 and 22 (FIG. 3). Contact between the second end 12B of the first frame member 12 and the first end 22A of the second frame member 22 adjacent the hinge 26 limits the pivoting angle between the first frame member 12 and the second frame member 22 to less than or equal to 90°. The hinge 26 is preferably a piano hinge similar to the Hinge McMaster-Carr A57. The end member 24 is preferably constructed of 0.125 inch (0.318 cm) aluminum with a height of 1.25 inch (3.18 cm) and a channel width of 1.25 inch (3.18 cm).

The center members 28 preferably have a first and second end 28A and 28B and are mounted at the first end 28A to the end member 24 (FIG. 6). The center members 28 extend outward essentially perpendicular to the end member 24 with the second ends 28B of the center members 28 forming the second end 22B of the second frame member 22. The center members 28 preferably are angled slightly away from the perpendicular due to the mounting of the angled support members 32 (to be described in detail hereinafter). The first ends 28A of the center members 28 are mounted such that each of the members 28 is spaced an equal distance from the adjacent end of the end member 24. The center members 28 preferably have first and second legs 28C and 28D which form a 90° angle. The center members 28 are mounted in the channel 24D of the end member 24 such that the first legs 28C of the center members 28 extend parallel to the channel 24D and the second legs 28D extend perpendicular to the channel 24D of the end member 24 (FIG. 6). The first legs 28C of the center members 28 are preferably secured to the first leg 24A of the channel 24D. Each of the second legs 28D of the center members 28 at the first end 28A are provided with a slot which allows for mounting the second legs 28D of the center members 28 over the first leg 24A of the end member 24. The center members 28 are mounted such that the corners of the center members 28, where the first and second legs 28C and 28D intersect, face each other toward the center of the end member 24. Each of the first legs 28C of the center members 28 at the second end 28B are provided with cutouts 28E which extend down from the second end 28B of the center member 28. The cutouts 28E preferably have a rectangular shape with a width of 1.25 inch (3.175 cm) and a length of 1.50×2.0 inch (3.81×5.08 cm). The second ends 28B of the center members 28 adjacent the cutouts 28E are provided with corner supports 30 (FIG. 3A). The corner supports 30 preferably have an angular shape with a first leg 30A and a second leg 30B. The corner supports 30 are mounted between the legs 28C and 28D of the center members 28 such as to form a square cross-section with the legs 28C and 28D of the center member 28. The corner supports 30 preferably extend the length of the cutout 28E at the second end 28B of the center members 28. The first legs 30A of the corner supports 30 opposite the cutout 28E are shorter than the second legs 30B of the corner supports 30. The cutouts 28E in the center members 28 and the short sides of the corner supports 30 enable the third frame member 42 to pivot freely a total of 90°. The center members 28 are preferably constructed of 1.50×2.00 inch (7.62 cm) angle aluminum having a height of 19.0 inch (48.26 cm). The corner supports 30 are preferably constructed of the same size, shape and type of material as the center members 28.

The pair of angled support members 32 preferably have a square cross-section with a first end 32A and a second end 32B. The first ends 32A of the support members 32 are mounted in the channel 24D of the end member 24 adjacent each of the ends of the end member 24. The second ends 32B of the support members 32 are mounted adjacent the second end 28B of the center members 28 below the cutout 28E and the corner supports 30 (FIG. 6). In the preferred embodiment, the first ends 32A of the support members 32 extend upward from the end member 24 toward the center member 28 at approximately a 27° angle. The second ends 32B of the support members 32 are preferably angled such that the second ends 32B of the support members 32 lay flat against the second leg 28D of the center member 28 to provide a secure mounting. The support members 32 are also mounted along the first leg 28C of the center member 28 to provide a more secure mounting. The mounting of the support members 32 within the channel 24D at the first ends 32A and adjacent the second leg 28D of the center members 28 at the second end 32B requires that either the support members 32 be slightly warped or the center members 28 extend at an angle to allow the second ends 32B of the support members 32 to be within the center members 28 adjacent the second legs 28B. The support members 32 on the second frame member 22 add support to the second frame member 22 and act to balance the apparatus 10 during use as a game carrier. The width of the first end 22A of the second frame member 22 is about 21.0 inch (53.34 cm) and the width of the second frame member 22 at the second end 22B is about 7.50 inch (19.05 cm). In the preferred embodiment, the second frame member 22 has a length of 19.0 inch (48.26 cm). The support members 32 are preferably constructed of 0.5×1.0 inch (1.27×2.54 cm) rectangular tubular aluminum.

A brace member 34 is preferably provided between the center members 28 adjacent the second end 28B of the members 28. In the preferred embodiment, the brace member 34 is mounted on and extends between the second legs 28D of the center members 28 approximately adjacent and opposite the point where the second ends 32B of the support members 32 are mounted on the second legs 28D of the center members 28 (FIG. 1). The brace member 34 is mounted such that a first leg 34A of the brace member 34 extends toward the first end 22A of the second frame member 22 and a second leg 34B extends outward toward the corners of the center members 28 parallel to the bottom wall 24C of the end member 24. The brace member 34 acts to hold the center members 28 in the spaced apart position and thus provides support for the second frame member 22 and the entire apparatus 10. The first leg 34A of the brace member 34 is preferably provided with a notch 34C which is used to help support the apparatus 10 in a tree 100 when in the hunting stand configuration to enable the user to secure the hunting stand to the tree 100 using a mounting strap 40 when the apparatus is being used as a tree stand.

Figure 5:
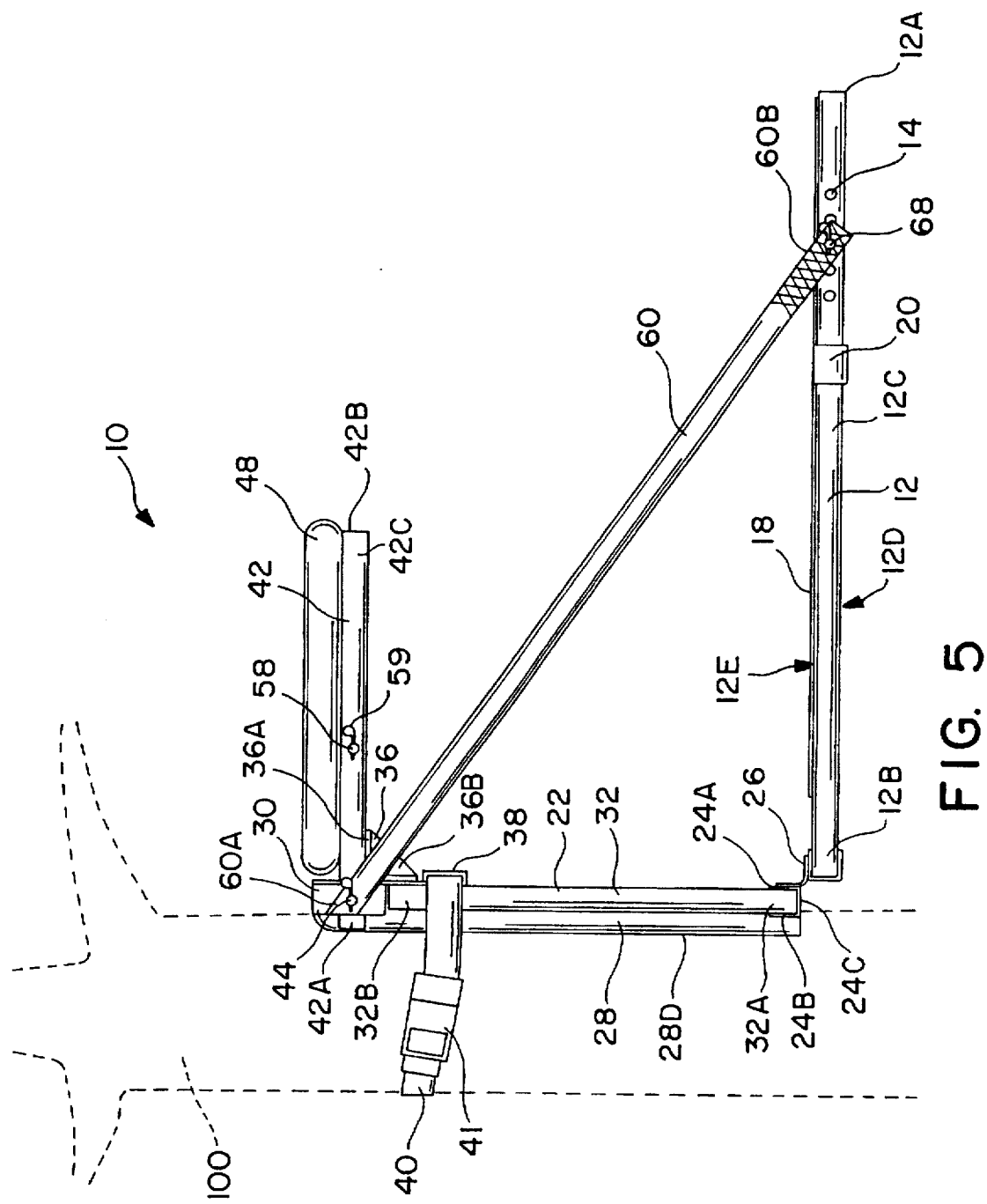
FIG. 5 is a side view of the apparatus 10 in the hunting stand configuration mounted to a tree.

A pair of supports 36 are mounted on the first leg 28C of each of the center members 28 adjacent the cutouts 28E. The supports 36 include a support surface 36A and an angular brace 36B (FIG. 3A). The supports 36 are mounted on the center members 28 such that the support surface 36A extends outward perpendicular to the second leg 28D of the center member 28 on the side opposite the support members 32. The support surface 36A is preferably positioned on the first leg 28C of the center member 28 slightly below the cutout 28E (FIG. 3A). The angular brace 36B is mounted on the bottom surface of the support surface 36A and extends between the support surface 36A and the first leg 28C of the center members 28. The support surface 36A preferably has a width at least equal to the width of the legs 42C of the third frame member 42 (to be described in detail hereinafter). In the preferred embodiment, the length of the support surface 36A is approximately 1.50 inch (3.81 cm). However, the length of the support surface 36A can be adjusted as necessary to provide ample support for the third frame member 42. Loops 38 are provided on each of the first legs 28C of the center members 28 on the side opposite the supports 36 (FIG. 5). The passageways formed by the loops 38 extend parallel to the second legs 28D of the center members 28. The loops 38 allow for attachment of the mounting strap 40 having a belt 41 secured to the second frame member 22.

The third frame member, or yoke 42, is preferably U-shaped with a first end 42A and a second end 42B with a pair of spaced apart parallel legs 42C extending therebetween. The legs 42C are connected together at one end to form the U-shaped third frame member 42 and the second end which define the longitudinal axis A—A of the third frame member 42 (FIG. 7). The first end 42A of the third frame member 42 is connected to the second end 22B of the second frame member 22. The legs 42C of the third frame member 42 are pivotably connected to the second legs 28D of the center members 28 at the second ends 28B. The third frame member 42 is mounted such that each of the legs 42C of the third frame member 42 extends adjacent each of the center members 28. The legs 42C are pivotably mounted by permanent attachment pins 44 which extend through the second leg 28D of the center member 28 through the leg 42C of the third frame member 42 and through the second leg 30B of the corner support 30 parallel and opposite the second leg 28D of the center member 28 (FIG. 3A). The attachment pins 44 are preferably fixedly secured such that the third frame member 42 is not easily removed from the second frame member 22. The attachment pins 44 extend through the second leg 28D of the center members 28 of the second frame member 22 through the legs 42C of the third frame member 42 and through the second leg 30B of the corner support 30. The attachment pin 44 extends outward beyond the second leg 30B of the corner support 30 and beyond the first leg 28C of the center member 28. The attachment pin 44 is provided with an aperture for mounting a hair pin 45 for securing a handle 60 in place when the handle 60 is used as a brace in the hunting stand configuration (to be described in detail hereinafter). The legs 42C of the third frame member 42 are mounted such that the ends of the legs 42C extend beyond the second legs 28D of the center members 28. The legs 42C are supported on the support surface 36A of the supports 36 when the third frame member 42 is pivoted into a position perpendicular to the second frame member 22 (FIG. 3A) to accommodate the seat in the hunting stand configuration.

A pair of mounting posts 46 having first and second ends 46A and 46B are mounted at the first ends 46A between the legs 42C of the third frame member 42 and extend inward toward each other perpendicular to the longitudinal axis A—A of the third frame member 42 (FIG. 7). The mounting posts 46 are of a length such that the second ends 46B of the mounting posts 46 are spaced approximately 7.50 inches (19.05 cm) apart from each other. Each of the mounting posts 46 is provided with a center bore 46C which extends completely through the posts 46. The legs 42C of the third frame member 42 are provided with holes 42D aligned with the center bores 46C of the mounting posts 46. The mounting posts 46 are mounted on the legs 42C of the third frame member 42 apart from the first end 42A of the third frame member 42 at least a distance slightly greater than the radius of the wheel 48 such that when the wheel 48 is mounted between the mounting posts 46 of the third frame member 42 in the game carrier configuration, the wheel 48 is able to rotate between the mounting posts 46 and the legs 42C of the third frame without contacting the first end 42A of the third frame member 42 (FIG. 1). The mounting posts 46 are also spaced away from the second end 42B of the third frame member 42 a distance greater than the radius of the wheel 48 such that when mounted as the seat in the game carrier configuration, the tire section 54 of the wheel 48 is spaced inward from the second end 42B of the third frame member 42 a distance greater than the distance the second end 28B of the center members 28 extend beyond the second end 42B of the third frame member 42 (FIG. 5). The spaced apart distance of the perimeter of the wheel 48 from the second end 42B of the third frame member 42 when in the seat position, allows the third frame member 42 to be positioned parallel to the second frame member 22 without the wheel 48 contacting the second end 28B of the center members 28. The positioning of the mounting posts 46 allows the wheel 48 to freely rotate in the wheel position and allows the wheel 48 to lie flat on the legs 42C of the third frame member 42 in the seat position (to be described in detail hereinafter).

Figure 2:
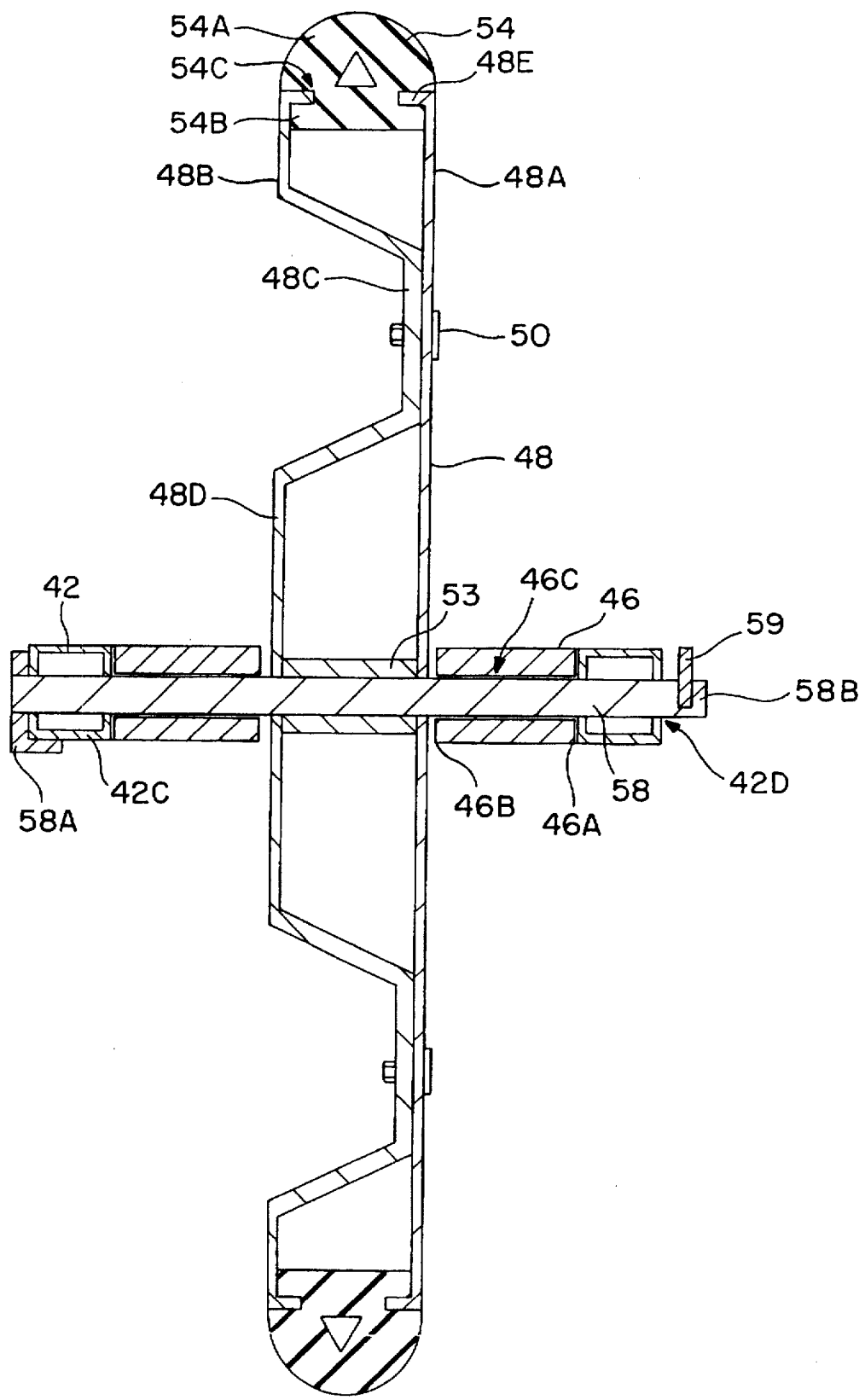
FIG. 2 is a cross-sectional view of FIG. 1 along line 2—2, showing the wheel 48 mounted on the mounting pin 58 between the mounting posts 46 of the third frame member 42.

A wheel 48 is provided for mounting on the third frame member 42. The wheel 48 preferably has a first plate 48A and a second plate 48B with a tire section 54 extending around the circumference of the wheel 48. The first plate 48A of the wheel 48 is preferably flat and circular. The second plate 48B of the wheel 48 is preferably circular with an annular groove 48C spaced slightly inward from the perimeter of the plate 48B such as to form a center hub 48D of the wheel 48 around the center of the wheel 48. In the preferred embodiment, the plates 48A and 48B are mounted together such that the annular groove 48C of the second plate 48B is in contact with the first plate 48A and the remainder of the second plate 48B is spaced apart from the first plate 48A. The plates 48A and 48B are mounted together by fasteners 50 extending through both the plates 48A and 48B. The fasteners 50 are preferably located in the annular groove 48C of the second plate 48B. The fasteners 50 can be any well known fasteners 50 such as rivets. In the preferred embodiment, the plates 48A and 48B both are constructed of 0.0625 inch (0.1588 cm) aluminum sheet metal and have a diameter of 13.0 inch (33.02 cm). The center hub 48D of the wheel 48 has a center bore 52 extending completely through the center hub 48D of the wheel 48. A bushing 53 is located in the center bore 52 of the wheel 48 between the plates 48A and 48B. The tire section 54 of the wheel 48 preferably has a rounded top portion 54A and a rectangular bottom portion 54B with a notch 54C therebetween (FIGS. 2 and 4). The tire section 54 is mounted between the plates 48A and 48B around the perimeter of the wheel 48. The tire section 54 is mounted such that the rectangular bottom portion 54B is spaced between the first and second plates 48A and 48B of the wheel 48. In the preferred embodiment, the first and second plates 48A and 48B each have an annular flange 48E around the perimeter of the wheel 48 which extend into the notch 54C of the tire section 54 and help to secure the tire section 54 between the plates 48A and 48B (FIGS. 2 and 4). Preferably when the tire section 54 is mounted around the perimeter of the wheel 48, the top portion 54A of the tire section 54 is flush with the first and second plates 48A and 48B at the perimeter of the wheel 48. The wheel 48 preferably has an outer diameter of approximately 14.0 inch (35.56 cm).

A mounting block 56 is provided on the center hub 48D of the wheel 48 slightly spaced apart from the center bore 52 of the wheel 48 (FIG. 7). The mounting block 56 has a hole 56A which extends completely through the block 56 perpendicular to the center bore 52 in the center hub 48D. A mounting pin 58 is provided to mount the wheel 48 onto the third frame member 42. The head 58A of the pin 58 has an L-shape such that the head 58A conforms to one side and one corner of the leg 42B of the third frame member 42 (FIG. 2). The head 58A prevents the pin 58 from rotating when the wheel 48 rotates. The end 58B of the pin 58 has a hole to allow for inserting a pin 59 to secure the pin 58 in place. The hair pin 59 prevents the pin 58 from falling out of the third frame member 42. The mounting pin 58 has a length slightly greater than the width of the third frame member 42. The diameter of the mounting pin 58 is preferably slightly smaller than the diameter of the hole 56A of the mounting block 56 to allow for easier mounting of the wheel 48 as the seat in the hunting stand configuration (FIG. 4) and slightly smaller than the bushing 53 in the center bore 52 of the wheel 48 such that the wheel 48 is able to freely rotate between the mounting posts 46 around the mounting pin 58 when used as the wheel in the game carrier configuration (FIG. 2). The mounting pin 58 provides the axle for the wheel 48 and defines the axis of rotation of the wheel 48 in the game carrier configuration.

Figure 9:
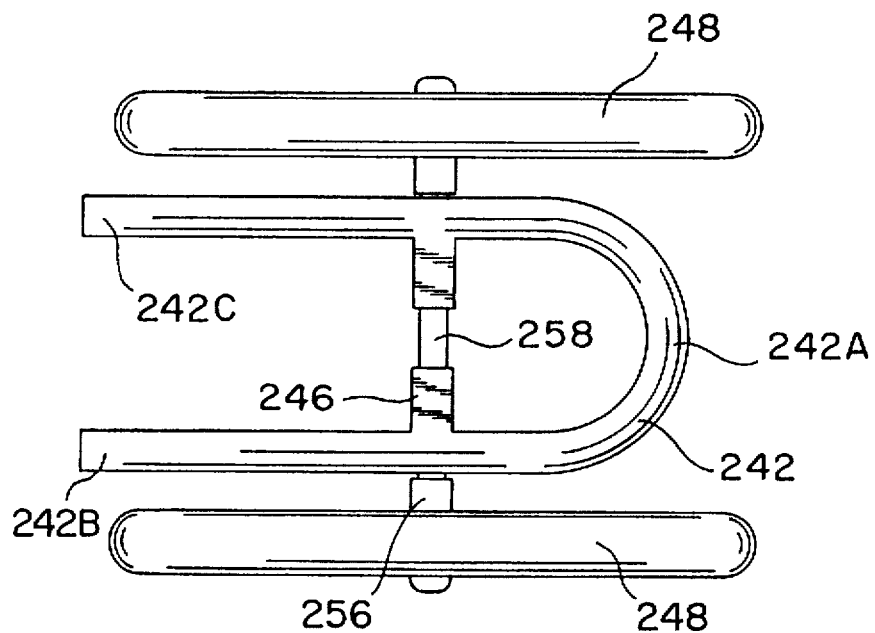
FIG. 9 is a partial top view of the second embodiment of the apparatus in the game carrier configuration showing the wheels 248 mounted on the legs 242C of the third framer member 242.
Figure 10:
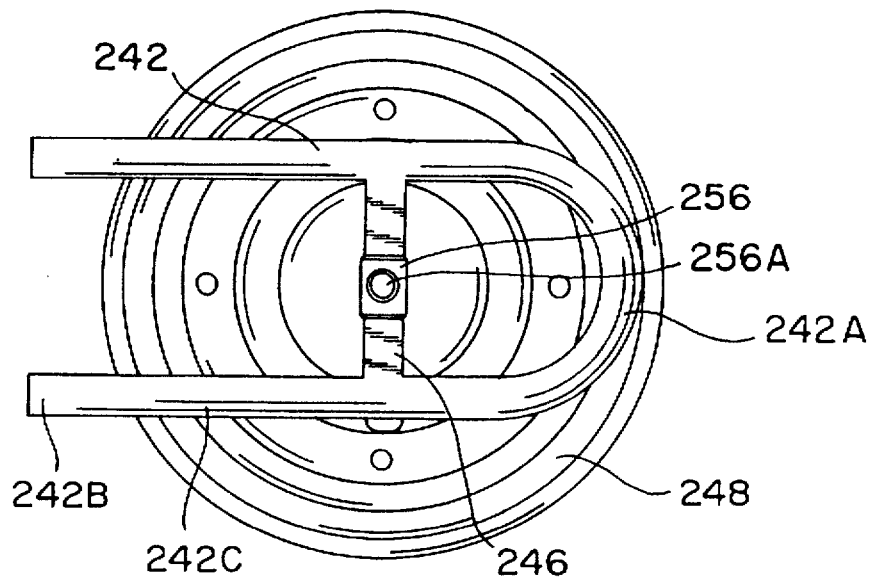
FIG. 10 is a partial bottom view of the third frame member 242 of the second embodiment of the apparatus showing the one wheel 248 mounted between the mounting posts 246 to provide the seat for the hunting stand configuration.

In a second embodiment shown in FIGS. 9 and 10, the apparatus (not shown) is similar to the apparatus 10 of the preferred embodiment except that the apparatus is provided with two wheels 248. One of the wheels 248 is mounted on each of the legs 242C of the third frame member 242 on the sides opposite the other leg 242C. In the game carrier configuration, the apparatus resembles a wheelbarrow but with two wheels 248. The wheels 248 are similar to the wheel 48 of the preferred embodiment except that the mounting block 256 is positioned over the center bore 252 in the center of the wheel 248. The mounting block 256 has a first bore 256A which is aligned with the center bore 252 in the center of the wheel 248 and a second bore (not shown) extending perpendicular to the first bore 256A. The second bore allows for mounting one of the wheels 248 in the seat position and the other wheel 248 in the stored position on the first frame member (not shown). The first bore 256A allows both of the wheels 248 to be mounted in the wheel position to the third frame member 242. The mounting pin 258 for the wheels 248 preferably has a split shaft. When the apparatus is in the hunting stand configuration, one half of the shaft is used to mount one of the wheels 248 between the mounting posts 246 of the third frame member 242 in the seat position. The other half of the shaft is used to secure the other wheel 248 in the storage position on the first frame member. For the game carrier configuration, the halves of the shaft are attached together to form a single mounting pin 258 for providing a single axis of rotation for both wheels 248. In the second embodiment, the third frame member 242 is mounted to the second frame member (not shown) closer to the first end 242A of the third frame member 242. The increased distance between the second frame member 22 and the second end 242B of the third frame member 242 allows the mounting posts 246 of the third frame member 242 to be spaced a greater distance from the second end 22B of the second frame member 22. The greater distance is necessary to allow for the different position of the mounting block 256 on the wheel 248 which tends to mount the wheel 248 closer to the first end 242A of the third frame member 242 than in the preferred embodiment.

In the preferred embodiment, the apparatus 10 is provided with an elongate member or a pair of handles 60 for use in moving the apparatus 10 in the game carrier configuration and for bracing the apparatus 10 in the hunting stand configuration (FIGS. 1 and 5). The handles 60 preferably have a first end 60A and a second end 60B with a bend 60C adjacent the second end 60B. The bend 60C preferably has an angle of between about 10° and 2°. The handles 60 have first holes which extend completely through the handles 60 at both ends 60A and 60B. The handles 60 also have a second hole adjacent the first end 60A which extends completely through the handles 60 perpendicular to the first holes. The outer surface of the handles 60 at the second end 60B is preferably knurled to allow for better gripping of the handles 60. The handles 60 preferably have a circular cross-section and are hollow with an outer diameter of about 1.0 inch (2.54 cm). The handles 60 preferably have a length of 36.0 inch (91.4 cm). A pair of securing pins 68 are provided for extending through the first holes at the second end 60B of the handles 60 and one of the holes 14 in the side 12C of the first frame member 12 for mounting the handles 60 in the brace position in the hunting stand configuration (FIGS. 3A and 5) and for extending through the second hole of the handles 60 and one of the holes 14 in the sides 12C of the first frame member 12 for mounting the handles 60 in the handle position in the game carrier configuration (FIG. 1).

The apparatus 10 of the present invention is easily converted from a hunting stand to a game carrier and vice versa. When in the hunting stand configuration, the apparatus 10 can also be used as a tree stand. In the preferred embodiment, the apparatus 10 is easily folded for transportation or storage (FIG. 8). To fold the apparatus 10, the third frame member 42 is moved into a position parallel to and aligned with the second frame member 22. Thus, the second and third frame members 22 and 42 are in essentially the same plane. The supports 36 mounted between the legs 28C and 28D of the center member 28 prevents the third frame member 42 from rotating more than 90°. The wheel 48 is mounted on the third frame member 42 in the seat position (to be described in detail hereinafter). In the second embodiment, one wheel 248 is mounted in the seat position and the other wheel is mounted in the storage position. The second frame member 22 with the third frame member 42, is pivoted along the piano hinge 26 toward the bottom surface 12E of the first frame member 12. The openings 18A in the support surface 18 of the first frame member 12 accommodates the supports 36 of the second frame member 22 and allows the second frame member 22 to rest more fully on the support surface 18 of the first frame member 12. Once in the folded position, the mounting strap 40 is then wrapped around the first and second frame members 12 and 22 and secured tightly using a buckle 41 (FIG. 8). Each of the handles 60 is mounted through one of the mounting brackets 20 on the sides 12C of the first frame member 12. The handles 60 are mounted such that the first end 60A of the handle 60 is adjacent the first end 12A of the first frame member 12 and the second end 60B of the handle 60 is adjacent the second end 12B of the first frame member 12. The handles 60 are positioned such that the second hole of the handle 60 is aligned with one of the holes 14 in the side 12C of the first frame member 12 adjacent the first end 12A of the first frame member 12. The securing pin 68 for the handle 60 is extended through one of the holes 14 in the side 12C of the first frame member 12 and through the aligned second hole in the handle 60 and secured using the hair pin to hold the handle 60 securely in place along the side 12C of the first frame member 12. In the folded position, the apparatus 10 is easily carried and occupies less space during storage. In the preferred embodiment, the length of the second and third frame members 22 and 42 with the third frame member 42 parallel to the second frame member 22 is approximately equal to the length of the first frame member 12 (FIG. 8). Consequently, when the apparatus 10 is in the folded position, the length of the apparatus 10 is equal to the length of the first frame member 12. In the preferred embodiment, the total weight of the apparatus 10 is about 18 lbs.

To convert the apparatus 10 into the game carrier configuration from the folded position, the mounting strap 40 is first released. Next, the second and third frame members 22 and 42 are pivoted along the piano hinge 26 upward away from the bottom surface 12E of the first frame member 12. The second frame member 22 with the first frame member 12 is pivoted about 180° such that the first frame member 12 is parallel and aligned with the second and third frame members 22 and 42. Thus, the first, second and third frame members 22 and 42 all essentially occupy the same plane (FIG. 1). The wheel 48 is removed from the third frame member 42 by removing the mounting pin 58 from the wheel 48. The wheel 48 is rotated and placed between the mounting posts 46 of the third frame member 42 such that the center bore 52 in the center of the wheel 48 is aligned with the center bores 46C of the mounting posts 46. In the preferred embodiment, the wheel 48 is rotated 90° from the seat position to the wheel position. The mounting pin 58 is extended through the hole 42D in one leg 42C of the third frame member 42 through one mounting post 46 through the center bore 52 of the wheel 48 through the other mounting post 46 and through the hole 42 in the other leg 42C of the third frame member 42. The mounting post 46 is secured using the hair pin 59. In the second embodiment, the wheel 248 in the seat position is removed and the wheel 248 in the storage position is removed. Next, the wheels 248 are rotated such that the center bore of the wheels 248 is aligned with the center bore of the mounting posts 246 and the wheels 248 are each adjacent a side of a leg 242C of the third frame member 242 opposite the other wheel 248. The two halves of the shaft of the mounting pin 258 are attached together to form a single mounting pin 258. The mounting pin 258 is then extended through one wheel 248, through the one leg 242C of the third frame member 242 through both of the mounting posts 246, through the other leg 242C of the third frame member 242 and finally through the other wheel 248. The mounting pin 258 is secured similar to the preferred embodiment.

Finally, the handles 60 are mounted through the brackets 20. The handles 60 are mounted such that the first end 60A of the handle 60 extends through the bracket 20 and the second end 60B of the handle extends outward beyond the first end 12A of the first frame member 12. The handles 60 are mounted such that the second hole in the handle 60 is aligned with one of the holes 14 in the side 12C of the first frame member 12. The securing pin 68 is then inserted into the hole 14 in the side 12C of the first frame member 12 and through the second hole in the handle 60. The hair pin is then secured through the second end of the pin 68 to secure the handle 60 in place. The handles 60 are mounted such that when the apparatus 10 is positioned with the support surface 18 adjacent the ground surface 150, the second end 60B of the handle 60 is bent downward. The bend 60C in the handle 60 allows the user to achieve greater lift when used in the game carrier configuration and also allows for easier balancing of the game apparatus 10 during use in the game carrier configuration. To use the apparatus 10 as a game carrier, the user places the apparatus 10 flat on the ground surface such that the support surface 18 is adjacent the ground surface. The game (not shown) is then positioned on the top surface 12D of the first frame member 12 and the second frame member 22 depending on the size of the game. The apparatus 10 can also be used to carry hunting equipment (not shown) or other loads in the game carrier configuration. The mounting strap 40 may then be used to secure the game or equipment to the first or second frame member 12 and 22. If the strap 40 is not used, then the strap 40 preferably secures around the second frame member 22 so as to not interfere with the operation of the apparatus 10 in the game carrier configuration. Next, the user grasps the second end 60B of the handles 60 and lifts, balancing the apparatus 10 on the wheel 48. In this configuration, the apparatus 10 resembles a wheelbarrow. The user moves the apparatus 10 by pushing or pulling on the handles 60 similar to using a wheelbarrow. In the second embodiment, where the apparatus has two wheels 248, the apparatus is used similar to the apparatus 10 of the preferred embodiment for transporting game and equipment on the apparatus in the game carrier configuration.

To convert the apparatus 10 from the game carrier configuration to the hunting stand configuration, the handles 60 are first removed from the sides 12C of the first frame member 12. Next, the second ends 60B of the handles 60 are mounted to the sides 12C of the first frame member 12. The handles 60 are mounted such that the securing pin 68 extends through the first hole in the second end 60B of the handle 60 and into one of the holes 14 in the side 12C of the first frame member 12. The handles 60 are mounted outside of the brackets 20 such that the first end 60A of the handle 60 extends outward and upward toward the second end 12B of the first frame member 12. In the preferred embodiment, when in the hunting stand configuration, the bends 60C in the handles 60 extend outward away from the sides 12C of the first frame member 12. The bends 60C allow the user additional room on the support surface 18 of the first frame member 12 and allow the handles 60 to be secured easier when used in the brace position for the hunting stand configuration. Next, the second frame member 22 is pivoted upward along the piano hinge 26 until the second frame member 22 is at approximately a 90° angle or perpendicular to the first frame member 12. The first end 60A of the handle 60 is then mounted at the first hole over the end of the attachment pin 44 which secures the third frame member 42 to the second frame member 22. The handle 60 is locked in place using a hair pin. The third frame member 42 is then rotated 90° such that the third frame member 42 is perpendicular to the second frame member 22. In this configuration, the three (3) frame members 12, 22 and 42 form essentially a C-shape with the third frame member 42 spaced above and essentially parallel to the first frame member 12 and the second frame member 22 extend perpendicular thereto in between the first and third frame members 12 and 42 (FIG. 5). The wheel 48 is then removed from the third frame member 42 and rotated 90° and remounted on the third frame member 42 such that the mounting block 56 is spaced between the two mounting posts 46 of the third frame member 42 with the hole 56A in the mounting block 56 aligned with the center bores 46C of the mounting posts 46. The mounting pin 58 is then extended into the hole 42D in the one leg 42C of the third frame member 42 through the mounting posts 46 and the mounting block 56 and out through the hole 42 in the other leg 42C of the third frame member 42. When correctly positioned, the tire section 54 of the wheel 48 extends slightly beyond the first end 42A of the third frame member 42 and the second plate 48B of the wheel 48 is adjacent the third frame member 42. Once in this position, the apparatus 10 is placed on a ground surface and used as a hunting stand. The hunting stand is completely self-supporting mainly due to the use of the handles 60 in the brace position between the first frame member 12 and the second frame member 22. In this configuration the apparatus 10 can also be mounted or secured in a tree or on a post 100. One way to mount the apparatus 10 is to mount a nail or screw (not shown) into the tree 100. Next, the apparatus 10 is mounted on the nail or screw such that the notch 34C in the first leg 34A of the brace member 34 is seated on the nail or screw. By mounting the apparatus 10 on the nail, the user can then easily secure the apparatus to the tree using other means such as the mounting strap 40. In this position, the second legs 28D of the center members 28 of the second frame member 22 are adjacent the trunk of the tree 100 and act to grab the trunk. The mounting strap 40 is then secured around the tree 100. Alternatively, the apparatus 10 is mounted in the tree 100 using only the mounting strap 40. The camming action of the second legs 28D of the center members 28 of the second frame member 22 against the tree 100 acts to keep the apparatus 10 aloft in the tree 100 (FIG. 5).

In the brace position in the hunting stand configuration, the mounting of the second end 60B of the handle 60 can be moved into any of the holes 14 in the sides 12C of the first frame member 12. By adjusting the position of the handles 60 along the first frame member 12, the angle between the first frame member 12 and the second frame member 22 is varied. Preferably, the angle is variable between 80° and 100°. Varying the slope of the first frame member 12 allows for use of the apparatus 10 in trees 100 which are angled. From the hunting stand configuration, the apparatus 10 is easily folded for storage or transport or converted to the game carrier configuration as described above.

It is intended that the foregoing description be only illustrative of the present invention and that the present invention be limited only the hereinafter appended claims.

We claim:

1. A combination hunting stand and game carrier apparatus which can be configured as one or the other, which comprises:

(a) a first frame means having opposed ends forming a support surface therebetween for supporting game when the apparatus is in the game carrier configuration;

(b) a second frame means having opposed ends with one end pivotably connected to one end of the first frame means;

(c) a third frame means having opposed ends with one end pivotably connected to the other end of the second frame means;

(d) a connecting means for holding the first, second and third frame means in one of the configurations;

(e) at least one wheel removably mounted on the third frame means enabling the apparatus to be moved when in the game carrier configuration, wherein the wheel is able to be removed from the third frame means and mounted on the third frame means to provide a seat means when the apparatus is in the hunting stand configuration;

(f) a handle means mounted on the first frame means for transporting the apparatus when configured as the game carrier; and (g) a securing means provided on the second frame for mounting the apparatus on a support when in the hunting stand configuration.

2. A combination hunting stand and game carrier apparatus which can be configured as one or the other, which comprises:

(a) a first frame means having opposed ends forming a support surface therebetween for supporting game when the apparatus is in the game carrier configuration;

(b) a second frame means having opposed ends with one end pivotably connected to one end of the first frame means;

(c) a third frame means having opposed ends with one end pivotably connected to the other end of the second frame means wherein in the hunting stand configuration, the first, second and third frame means are configured in a C-shape with the third frame means spaced above the first frame means;

(d) a connecting means for holding the first, second and third frame means in one of the configurations;

(e) at least one elongate member having opposed ends and adapted to be connected at one of the ends to the first frame means when the apparatus is in the game carrier configuration to serve as a handle and adapted to be connected at one of the ends to the first frame means and at the other one of the ends to the second frame means to serve as a brace means when the apparatus is in the hunting stand configuration;

(f) at least one wheel removably mounted on the third frame means so that a longitudinal axis of the wheel is parallel to the ends of the third frame means when the apparatus is in the game carrier configuration for enabling the apparatus to be easily moved when the apparatus is in the game carrier configuration and is removed from the third frame means and mounted on the third frame means to provide a seat means when the apparatus is in the hunting stand configuration; and (g) a securing means provided on the second frame for mounting the apparatus on a support in the hunting stand configuration.

3. The apparatus of any one of claims 1 or 2 wherein there is a first and second connecting means.

4. The apparatus of claim 3 wherein the first connecting means is a piano hinge which extends between the one end of the first frame means and one end of the second frame means.

5. The apparatus of claim 3 wherein the second connecting means is a pair of pins which pivotably connect one end of the third frame means to the other end of the second frame means.

6. The apparatus of any one of claims 1 or 2 wherein the third frame means has essentially a U-shape with spaced apart legs and wherein an open end of the U-shaped third frame means is connected to the other end of the second frame means.

7. The apparatus of any one of claims 1 or 2 wherein a hub of the wheel is provided with a mounting block having an opening extending through the block perpendicular to the longitudinal axis of the wheel wherein the block provides for mounting of the wheel on the third frame means when the wheel is used to provide the seat.

8. The apparatus of claim 2 wherein the one end of the elongate member is angled downwards to allow for easier use of the elongate member as a handle when the apparatus is in the game carrier configuration.

9. The apparatus of claim 2 wherein there are two elongate members, one on each side of the apparatus, to serve as the brace means which holds the first, second and third frame means in the C-shape when the apparatus is in the hunting stand configuration.

10. The apparatus of any one of claims 1 or 2 wherein the wheel comprises a hollow tire having a first and second plate wherein the first plate is flat to allow the wheel to provide the seat means.

11. The apparatus of claim 2 wherein the connection of the one end of the elongate members to the first frame means is adjustable to allow for different angles between the first frame means and the second frame means for more flexibility in mounting of the hunting stand in a tree.

12. The apparatus of any one of claim 1 or 2 wherein in the hunting stand configuration, the apparatus is self supporting as a hunting stand.

13. The apparatus of any one of claims 1 or 2 wherein the second frame means has a frusto triangular shape with an apex adjacent the third frame means such that the apparatus resembles a wheelbarrow when in the game carrier configuration.

14. The apparatus of any one of claims 1 or 2 wherein the apparatus is foldable such as to allow for storage or transporting.

15. The apparatus of claim 13 wherein the second frame member means includes a base, at least one center member mounted on and perpendicular to the base and at least two side members connected to and extending between the base and the center member with at least one side member on each side of the center member so that the side members provide support for the apparatus when the apparatus is in the game carrier configuration.

16. The apparatus of claim 6 wherein the third frame means has a pair of mounting posts, each post being mounted at one end to one of the legs of the third frame means and extending inward from the legs toward each other such that the posts are aligned with each other and wherein the other ends of the posts are spaced apart such as to form an opening for mounting of the wheel when the apparatus is in either the game carrier configuration or the hunting stand configuration.

17. The apparatus of any one of claims 1 or 2 wherein there are two wheels removably mounted on the third frame means for enabling the apparatus to be moved when in the game carrier configuration and wherein one of the wheels is removed from the third frame means and mounted on the third frame means to provide the seat means and the other wheel is removed from the third frame means and mounted on the first frame means for storage when the apparatus is in the hunting stand configuration.

18. A method for configuring an apparatus as a game carrier or hunting stand, which comprises:

(a) providing a first frame means having opposed ends forming a support surface therebetween for supporting game and other loads when the apparatus is in the game carrier configuration and for supporting the user when the apparatus is in the hunting stand configuration; a second frame means having opposed ends with one end pivotably connected to one end of the first frame means; a third frame means having opposed ends with one end pivotably connected to the other end of the second frame means wherein in the hunting stand configuration, the first, second and third frame means are configured in a C-shape with the third frame means spaced above the first frame means; a connecting means for holding the first, second and third frame means in one of the configurations; at least one wheel removably mounted on the third frame means so that the wheel enables the apparatus to be moved when in the game carrier configuration, wherein the wheel is able to be removed from the third frame means and mounted on the third frame means to provide a seat means when the apparatus is in the hunting stand configuration; a handle means mounted on the first frame means for transporting the apparatus when configured as the game carrier; and a securing means provided on the second frame for mounting the apparatus on a support when in the hunting stand configuration;

(b) mounting the wheel as a seat in the hunting stand configuration or as a wheel in the game carrier configuration; and (c) pivoting the first, second and third frame means into one of the configurations with the connecting means holding the frames in one of the configurations, wherein the handle means serves as a brace in the hunting stand configuration and as a handle in the game carrier configuration.

19. A method for configuring an apparatus as a game carrier or as a hunting stand, which comprises:

(a) providing a first frame means having opposed ends forming a support surface therebetween for supporting game and other loads when the apparatus is in the game carrier configuration and for supporting the user when the apparatus is in the hunting stand configuration; a second frame means having opposed ends with one end pivotably connected to one end of the first frame means; a third frame means having opposed ends with one end pivotably connected to the other end of the second frame means; a connecting means for holding the first, second and third frame means in one of the configurations; an elongate member having opposed ends and adapted to be connected at one of the ends to the first frame means when the apparatus is in the game carrier configuration to serve as a handle and adapted to be connected at one of the ends to the first frame means and at the other one of the ends to the second frame means to serve as a brace means when the apparatus is in the hunting stand configuration; at least one wheel removably mounted on the third frame means so that a longitudinal axis of the wheel is parallel to the ends of the third frame means when the apparatus is in the game carrier configuration for enabling the apparatus to be easily moved when the apparatus is in the game carrier configuration and is removed and mounted on the third frame means to provide a seat means when the apparatus is in the hunting stand configuration; and a securing means provided on the second frame for mounting the apparatus on a support in the hunting stand configuration;

(b) mounting the wheel as a seat in the hunting stand configuration or as a wheel in the game carrier configuration; and (c) pivoting the first, second and third frame means into one of the configurations with the connecting means holding the frames in one of the configurations wherein the elongate member serves as a brace in the hunting stand configuration and as a handle in the game carrier configuration.

20. A convertible apparatus which can be configured either as a game carrier or a hunting stand, which comprises:

(a) a platform defined by a first frame with opposed ends forming a first support surface therebetween for supporting game, sides between the ends and a top and a bottom with a second support surface mounted on the bottom of the frame for supporting a user when in the hunting stand position;

(b) a second frame with opposed ends, sides between the ends and a top and a bottom and connected at the bottom adjacent one of the ends by a hinge to the bottom of the first frame wherein the second frame tapers from the one of the ends of the second frame towards the other of the ends of the second frame;

(c) a third frame connected to the other of the ends of the second frame and having a U-shape with opposed legs which extend parallel to a longitudinal axis of the third frame and which attach to the other of the ends of the second frame;

(d) at least one wheel removably mounted on the legs of the U-shaped third frame wherein as the game carrier configuration the wheel has an axis of rotation which is perpendicular to the longitudinal axis of the third frame;

(e) a securing means provided on the second frame; and (f) a removable handle means mounted on each of the sides of the first frame wherein as the game carrier, the first, second and third frames are positioned so that the apparatus can be used to move game mounted on the platform with the wheel in contact with a ground surface and wherein as a hunting stand, the first, second and third frames are positioned in a C-shape with the bottom of the first frame and the second support surface in a reversed position, with the handle means secured between the sides of the first frame and the sides of the second frame with the wheel mounted on the third frame as a seat and with the securing means and the second frame in a position to be secured to a support.

21. The apparatus of claim 20 wherein the first frame has reinforcing ribs between the ends and parallel to the sides for providing support for the first support surface, wherein the second frame has parallel members extending between the ends of the second frame and wherein the legs of the third frame are connected to the members at the other of the ends of the second frame by pins, so that the third frame can be positioned such that the angle between the legs of the third frame and the members of the second frame is about 180° as the game carrier and such that the angle between the legs of the third frame and the members of the second frame is about 90° as the hunting stand.

22. The apparatus of any one of claims 20 or 21 wherein the wheel has opposed sides with a mounting block on one of the sides having an opening transverse to the axis of rotation of the wheel so that a removable mounting pin can be used to mount the wheel on the third frame to provide the seat and wherein the mounting pin serves as an axle for the wheel when the apparatus is configured as the game carrier.

23. The apparatus of any one of claims 20 or 21 wherein the wheel has opposed sides with a mounting block on one of the sides having an opening transverse to the axis of rotation of the wheel so that a removable mounting pin can be used to mount the wheel on the third frame to provide the seat and wherein the mounting pin serves as an axle for the wheel when configured as the game carrier and wherein the first frame has brackets on each of the sides into which the handle means is inserted and spaced apart holes in the sides adjacent the other of the ends of the first frame into which a removable securing pin is inserted to hold the handle means in position when configured as the game carrier.

24. The apparatus of any one of claims 20 or 21 wherein the wheel has opposed sides with a mounting block on one of the sides having an opening transverse to the axis of rotation of the wheel so that a removable mounting pin can be used to mount the wheel on the third frame to provide the seat and wherein the mounting pin serves as an axle for the wheel when configured as the game carrier and wherein the first frame has brackets on each of the sides into which the handle means is inserted and spaced apart holes in the sides adjacent the other of the ends of the first frame into which a removable securing pin is inserted to hold the handle means in position when configured as the game carrier and wherein the handle means can be connected to the holes in the first frame by the securing pin and to the second frame by an attachment pin adjacent the other of the ends of the second frame as the hunting stand.

* * * * *